United States Patent
Yoshii (10) Patent No.: US 12,191,472 B2
(45) Date of Patent: Jan. 7, 2025

(54) ELECTRODE STRUCTURE AND NON-AQUEOUS ELECTROLYTE SECONDARY BATTERY

(71) Applicant: Panasonic Intellectual Property Management Co., Ltd., Osaka (JP)

(72) Inventor: Kazuhiro Yoshii, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 523 days.

(21) Appl. No.: 16/973,622

(22) PCT Filed: Feb. 22, 2019

(86) PCT No.: PCT/JP2019/006875
§ 371 (c)(1),
(2) Date: Dec. 9, 2020

(87) PCT Pub. No.: WO2020/003605
PCT Pub. Date: Jan. 2, 2020

(65) Prior Publication Data
US 2021/0249642 A1    Aug. 12, 2021

(30) Foreign Application Priority Data
Jun. 28, 2018   (JP) .................. 2018-122882

(51) Int. Cl.
*H01M 4/131*   (2010.01)
*H01M 4/02*    (2006.01)
(Continued)

(52) U.S. Cl.
CPC ......... *H01M 4/0435* (2013.01); *H01M 4/131* (2013.01); *H01M 4/134* (2013.01);
(Continued)

(58) Field of Classification Search
CPC .... H01M 5/0435; H01M 5/131; H01M 5/134; H01M 10/0525; H01M 50/489; H01M 50/409; H01M 2004/028
See application file for complete search history.

(56) References Cited

U.S. PATENT DOCUMENTS

| 2006/0194116 A1 | 8/2006 | Suzuki et al. |
| 2006/0199294 A1* | 9/2006 | Fujikawa ................ H01M 4/13 438/42 |

(Continued)

FOREIGN PATENT DOCUMENTS

| JP | 2009181756 A * | 8/2009 |
| JP | 4476254 B2 | 6/2010 |

(Continued)

OTHER PUBLICATIONS

Cottrell, Alan. Introduction to Metallurgy.(1975). Maney Publishing for IOM3, the Institute of Materials, Minerals and Mining. 2nd edition. Chapter 4.4 Transition to Ionic Bonding, p. 46. (Year: 1975).*

(Continued)

*Primary Examiner* — Brian R Ohara
*Assistant Examiner* — Michelle T Leonard
(74) *Attorney, Agent, or Firm* — WHDA, LLP (57) ABSTRACT

A non-aqueous electrolyte secondary battery according to one aspect of the present application comprises: a positive electrode; a negative electrode; a heat-resistant layer that is formed on at least one of the positive electrode and the negative electrode; and a non-aqueous electrolyte, wherein the heat-resistant layer includes heat-resistant particles, at least the surface of said heat-resistant particles comprising a metal compound, the average thickness of the heat-resistant layer is within the range 0.5 μm-5 μm, the porosity of the heat-resistant layer is 25%-55%, the average surface roughness (Ra) of the heat-resistant layer is 0.35 μm or less, and (Continued)

the electronegativity of metal ions of the metal compound is 13.5 or greater.

10 Claims, 2 Drawing Sheets

(51) Int. Cl.
    *H01M 4/04*     (2006.01)
    *H01M 4/134*     (2010.01)
    *H01M 10/0525*     (2010.01)
    *H01M 50/409*     (2021.01)
    *H01M 50/489*     (2021.01)

(52) U.S. Cl.
    CPC .. *H01M 10/0525* (2013.01); *H01M 2004/027* (2013.01); *H01M 2004/028* (2013.01); *H01M 50/409* (2021.01); *H01M 50/489* (2021.01)

(56) References Cited

U.S. PATENT DOCUMENTS

| | | | | |
|---|---|---|---|---|
| 2008/0070107 | A1* | 3/2008 | Kasamatsu | H01M 50/451 429/144 |
| 2009/0325074 | A1* | 12/2009 | Fukumoto | H01M 50/446 429/231.95 |
| 2010/0227207 | A1* | 9/2010 | Fukumoto | H01M 50/446 429/94 |
| 2011/0151327 | A1* | 6/2011 | Imanari | H01M 50/489 429/231.95 |
| 2013/0244116 | A1* | 9/2013 | Watanabe | H01M 10/4235 429/211 |
| 2015/0228974 | A1 | 8/2015 | Kokado et al. | |
| 2017/0139336 | A1* | 5/2017 | Nagaoka | G03G 9/0802 |
| 2018/0277843 | A1 | 9/2018 | Yasuda et al. | |

FOREIGN PATENT DOCUMENTS

| | | |
|---|---|---|
| JP | 4602254 B2 | 12/2010 |
| JP | 5035712 B2 | 9/2012 |
| JP | 2013-191550 A | 9/2013 |
| JP | 2017-73317 A | 4/2017 |
| JP | 2018-160420 A | 10/2018 |
| WO | 2018/179900 A1 | 10/2018 |

OTHER PUBLICATIONS

JP2009181756A machine translation (Year: 2009).*
International Search Report dated May 28, 2019, issued in counterpart International Application No. PCT/JP2019/006875 (2 pages).

* cited by examiner

ELECTRODE STRUCTURE AND NON-AQUEOUS ELECTROLYTE SECONDARY BATTERY

TECHNICAL FIELD

The present disclosure relates to techniques of an electrode structure and a non-aqueous electrolyte secondary battery.

BACKGROUND ART

Recently, there has been widely used a non-aqueous electrolyte secondary battery which comprises a positive electrode, a negative electrode, and a non-aqueous electrolyte and which achieves charge and discharge by movement of lithium ions or the like between the positive electrode and the negative electrode, as a secondary battery providing high output and a high energy density.

For example, Patent Literature 1 proposes a non-aqueous electrolyte secondary battery including a positive electrode, a negative electrode, a porous heat-resistant layer interposed between the positive electrode and the negative electrode, and a non-aqueous electrolyte, in which the negative electrode includes a negative electrode current collector and a negative electrode mixture layer supported on a surface of the negative electrode current collector, the porous heat-resistant layer is supported on the negative electrode, the porous heat-resistant layer includes magnesium oxide particles, the magnesium oxide particles have an average particle size of 0.5 µm to 2 µm, and the negative electrode mixture layer has an active material density of 1.5 g/ml to 1.8 g/ml.

For example, Patent Literature 2 proposes a lithium ion secondary battery including a positive electrode, a negative electrode, a porous film (heat-resistant layer) interposed between the positive electrode and the negative electrode, a separator interposed between the positive electrode and the negative electrode, and a non-aqueous electrolyte solution, in which the porous film adheres to at least a surface of the negative electrode, the porous film has a thickness of 0.5 µm or more and 20 µm or less, the porous film has a surface roughness less than the surface roughness of an electrode surface adhering to the porous film, the porous film includes an inorganic filler and a first binder, the content of the first binder in the porous film is 1.5 to 8 parts by weight based on 100 parts by weight of the filler, the filler is at least one selected from the group consisting of alumina and titanium oxide, the separator has a thickness of 8 µm or more and 30 µm or less, the first binder includes first rubber including an acrylonitrile unit, the first rubber is insoluble in water and has a decomposition starting temperature of 250° C. or more, the negative electrode includes a negative electrode active material and a second binder, and the second binder includes second rubber particles and a water-soluble polymer.

For example, Patent Literature 3 proposes a positive electrode active material having a surface where fine particles including W and Li on surfaces of primary particles of lithium metal complex oxide powders are formed.

CITATION LIST

Patent Literature

PATENT LITERATURE 1: Japanese Patent Publication No. 4476254

PATENT LITERATURE 2: Japanese Patent Publication No. 4602254

PATENT LITERATURE 3: Japanese Patent Publication No. 5035712

SUMMARY

A heat-resistant layer formed on an electrode, if compressed and thus increased in adhesion, causes an increase in internal resistance of a battery in normal times, although can effectively suppress the temperature rise of a battery upon internal short. On the other hand, a heat-resistant layer formed on an electrode, if not compressed, has a difficulty in suppressing the temperature rise of a battery upon internal short, although is increased in ion permeability to thereby suppress an increase in internal resistance of a battery in normal times. Accordingly, in a case where a heat-resistant layer is formed on an electrode, it is difficult to satisfy both suppression of an increase in internal resistance of a battery and suppression of the temperature rise of a battery upon internal short.

Patent Literature 3 also cannot prevent the area of short due to shrinkage of the separator from being expanded upon internal short, and has a difficulty in suppressing the temperature rise of the battery.

It is an advantage of the present disclosure to provide an electrode structure and a non-aqueous electrolyte secondary battery, in which not only an increase in internal resistance of the battery can be suppressed, but also the temperature rise of the battery can be suppressed upon internal short.

A non-aqueous electrolyte secondary battery of one aspect of the present disclosure comprises a positive electrode, a negative electrode, a heat-resistant layer formed on at least any one of the positive electrode and the negative electrode, and a non-aqueous electrolyte, in which the heat-resistant layer includes heat-resistant particles having at least a surface including a metal compound, the heat-resistant layer has an average thickness in the range of 0.5 µm to 5 µm, the heat-resistant layer has a porosity of 25% to 55%, the heat-resistant layer has an average surface roughness (Ra) of 0.35 µm or less, and metal ions in the metal compound have an electronegativity of 13.5 or more.

An electrode structure of one aspect of the present disclosure comprises an electrode for use as a positive electrode or a negative electrode of a non-aqueous electrolyte secondary battery, and a heat-resistant layer formed on the electrode, in which the heat-resistant layer includes heat-resistant particles having at least a surface including a metal compound, the heat-resistant layer has an average thickness in the range of 0.5 µm to 5 µm, the heat-resistant layer has a porosity of 25% to 55%, the heat-resistant layer has an average surface roughness (Ra) of 0.35 µm or less, and metal ions in the metal compound have an electronegativity of 13.5 or more.

According to one aspect of the present disclosure, not only an increase in internal resistance of the battery can be suppressed, but also the temperature rise of the battery can be suppressed upon internal short.

DESCRIPTION OF EMBODIMENTS

As described above, in a case where a heat-resistant layer is formed on an electrode, it is difficult to satisfy both suppression of an increase in internal resistance of a battery and suppression of the temperature rise of a battery upon internal short. However, the present inventors have then made intensive studies, as a result, have found that both suppression of an increase in internal resistance of a battery and suppression of the temperature rise of a battery upon internal short can be satisfied due to use of a material including metal ions high in electronegativity, in a material constituting a heat-resistant layer, and furthermore adjustment of the thickness, porosity and surface roughness of a heat-resistant layer within respective predetermined ranges, and thus have conceived a non-aqueous electrolyte secondary battery shown in each aspect described below.

A non-aqueous electrolyte secondary battery of one aspect of the present disclosure comprises a positive electrode, a negative electrode, a heat-resistant layer formed on at least any one of the positive electrode and the negative electrode, and a non-aqueous electrolyte, in which the heat-resistant layer includes heat-resistant particles having at least a surface including a metal compound, the heat-resistant layer has an average thickness in the range of 0.5 μm to 5 μm, the heat-resistant layer has a porosity of 25% to 55%, the heat-resistant layer has an average surface roughness (Ra) of 0.35 μm or less, and metal ions in the metal compound have an electronegativity of 13.5 or more.

An electrode structure of one aspect of the present disclosure comprises an electrode for use as a positive electrode or a negative electrode of a non-aqueous electrolyte secondary battery, and a heat-resistant layer formed on the electrode, in which the heat-resistant layer includes heat-resistant particles having at least a surface including a metal compound, the heat-resistant layer has an average thickness in the range of 0.5 μm to 5 μm, the heat-resistant layer has a porosity of 25% to 55%, the heat-resistant layer has an average surface roughness (Ra) of 0.35 μm or less, and metal ions in the metal compound have an electronegativity of 13.5 or more.

The heat-resistant layer in the present disclosure is smoothened and compressed by rolling or the like so as to have any average thickness, porosity and average surface roughness in the above respective ranges. Such a heat-resistant layer smoothened and compressed by rolling or the like serves as a high-resistant component interposed between the positive and negative electrodes, upon internal short of the battery, and thus suppresses the temperature rise of the battery upon internal short. The heat-resistant particles included in the heat-resistant layer in the present disclosure are heat-resistant particles which have at least a surface including a metal compound and in which metal ions of the metal compound have an electronegativity of 13.5 or more, and heat-resistant particles having such composition are less attracted by a non-aqueous electrolyte and thus have the property of hardly inhibiting movement of ions. Accordingly, the heat-resistant layer including the heat-resistant particles has higher ion permeability than any heat-resistant layer not including the heat-resistant particles, and thus is suppressed in deterioration in ion permeability thereof and suppresses an increase in internal resistance of the battery, even if smoothened and compressed by rolling or the like.

Hereinafter, an exemplary embodiment will be described in detail. The drawings referred to in the description of embodiments are schematically illustrated, and the dimensional ratio of any constituent component depicted in the drawings may be different from that of any actual constituent component.

Figure 1:
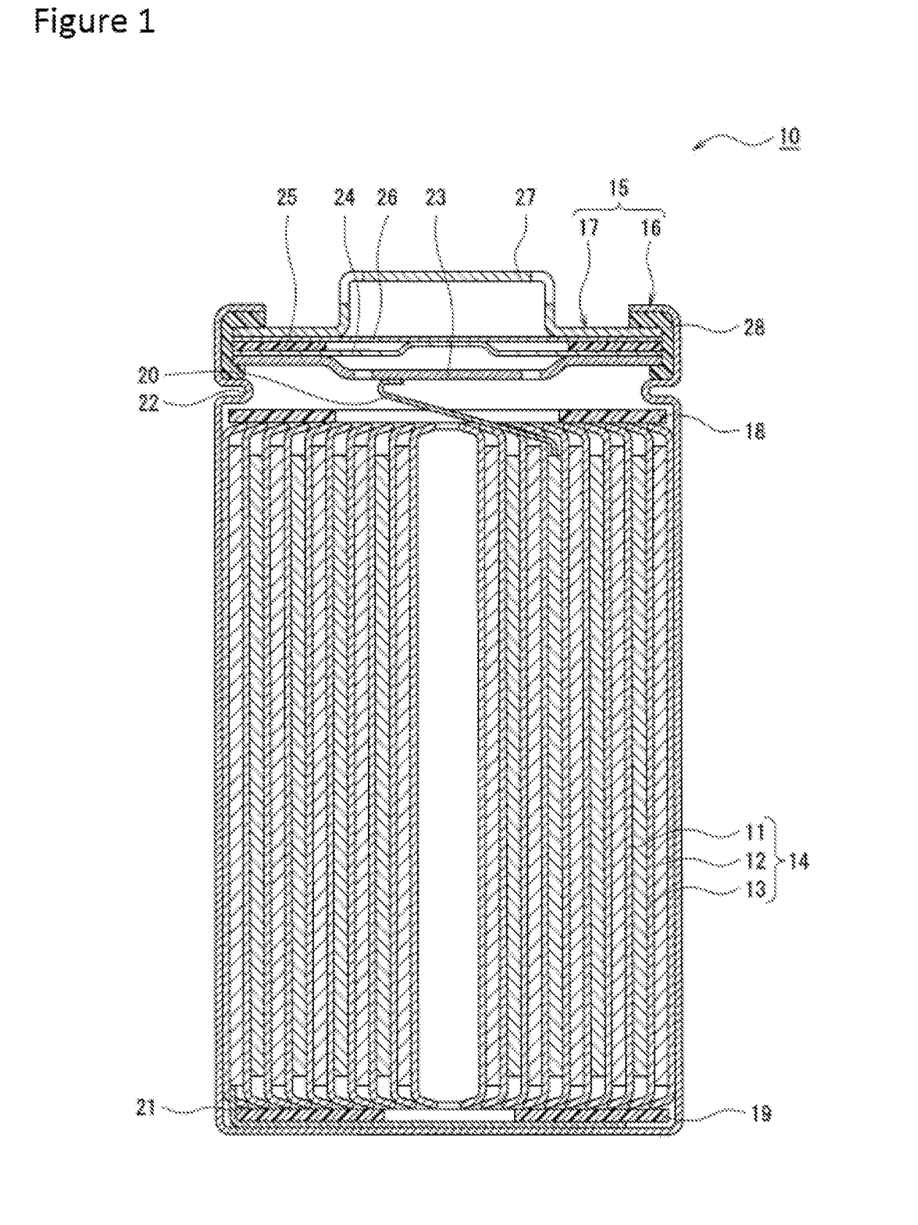
FIG. 1 is a sectional view of a non-aqueous electrolyte secondary battery of an exemplary embodiment.

FIG. 1 is a sectional view of a non-aqueous electrolyte secondary battery of an exemplar) embodiment. A non-aqueous electrolyte secondary battery 10 shown in FIG. 1 comprises a wound-type electrode element 14 formed by winding a positive electrode 11 and a negative electrode 12 with a separator 13 being interposed therebetween, a non-aqueous electrolyte, insulating plates 18 and 19 respectively disposed on and under the electrode element 14, and a battery case 15 that houses such members.

The non-aqueous electrolyte secondary battery 10 comprises a heat-resistant layer not shown in FIG. 1, which is formed on at least any one of the positive electrode 11 and the negative electrode 12. In other words, the heat-resistant layer is disposed at least any one of between the positive electrode 11 and the separator 13 and between the negative electrode 12 and the separator 13.

The battery case 15 is configured by a cylindrical case body 16 having a closed-end, and a sealing assembly 17 for closing the opening of the case body 16. Another form of electrode element, for example, a stacked electrode element formed by stacking alternately a positive electrode and a negative electrode with a separator being interposed therebetween may be here applied instead of the wound-type electrode element 14. Examples of the battery case 15 can include a cylindrical, rectangular, coin-shaped, or button-shaped metal case, and a resin case (laminated) formed by laminating a resin sheet.

The case body 16 is, for example, a cylindrical metal container having a closed-end. A gasket 28 is disposed between the case body 16 and the sealing assembly 17 to ensure that the interior of the battery is tightly sealed. The case body 16 includes, for example, a projecting portion 22 which has a lateral surface partially projected inward and which supports the sealing assembly 17. The projecting portion 22 is preferably formed annularly along the circumferential direction of the case body 16, and the upper surface thereof supports the sealing assembly 17.

The sealing assembly 17 has a structure in which a filter 23, a lower vent member 24, an insulating member 25, an upper vent member 26, and a cap 27 are stacked in the listed order sequentially from the electrode element 14 side. Each of the members constituting the sealing assembly 17 has, for example, a disk or ring shape, and the members other than the insulating member 25 are electrically connected to each other. The lower vent member 24 and the upper vent member 26 are connected to each other at respective middle portions and the insulating member 25 is interposed between respective circumferences. If the internal pressure increases by heat generation due to, for example, internal short, the lower vent member 24 changes its shape so as to, for example, push up the upper vent member 26 toward the cap 27, and thus ruptures, thereby breaking the electrical connection between the lower vent member 24 and the upper vent member 26. If the internal pressure further increases, the upper vent member 26 ruptures to discharge gas through the opening of the cap 27.

In the non-aqueous electrolyte secondary battery 10 shown in FIG. 1, a positive electrode lead 20 attached to the positive electrode 11 passes through a though-hole in the insulating plate 18 and extends toward the sealing assembly 17, and a negative electrode lead 21 attached to the negative electrode 12 passes on the outside of the insulating plate 19 and extends toward the bottom of the case body 16. The positive electrode lead 20 is connected to the lower surface of the filter 23, which is the bottom board of the sealing assembly 17, by welding or the like, and the cap 27, which is the top board of the sealing assembly 17 and electrically connected to the filter 23, serves as a positive electrode terminal. The negative electrode lead 21 is connected to the inner surface of the bottom of the case body 16 by welding or the like, and the case body 16 serves as a negative electrode terminal. The positive electrode lead may also be disposed not on an end, but on a middle portion in the longitudinal direction of the positive electrode 11. The middle portion corresponds to a region non-coated (non-coating portion) with the positive electrode active material layer, which is not coated with the positive electrode active material layer, and both sides of such a non-coating portion is coated with the positive electrode active material layer, in the longitudinal direction of the positive electrode 11. In a case where the positive electrode lead is provided on the middle portion, the positive electrode lead is joined to the non-coating portion.

Hereinafter, the positive electrode 11, the negative electrode 12, the heat-resistant layer, the separator 13, and the non-aqueous electrolyte will be described in detail.

[Positive Electrode]

The positive electrode 1 comprises, for example, a positive electrode current collector of metal foil or the like, and a positive electrode active material layer formed on the positive electrode current collector. The positive electrode current collector here used can be, for example, foil of a metal, such as aluminum, which is stable in the electric potential range of the positive electrode, or a film in which such a metal is disposed on an outer layer.

The positive electrode active material layer includes a positive electrode active material. The positive electrode active material layer suitably includes a conductive agent and a binder, in addition to the positive electrode active material.

Examples of the positive electrode active material can include a lithium/transition metal oxide containing a transition metal element such as Co, Mn, or Ni. Examples of the lithium/transition metal oxide include $Li_xCoO_2$, $Li_xNiO_2$, $Li_xMnO_2$, $Li_xCo_yNi_{1-y}O_2$, $Li_xCo_yM_{1-y}O_z$, $Li_xNi^{1-y}M_yO_z$, $Li_xMn_2O_4$, $Li_xMn_{2-y}M_yO_4$, $LiMPO_4$, or $Li_2MPO_4F$ (M: at least one of Na, Mg, Sc, Y, Mn, Fe, Co, Ni, Cu, Zn, Al Cr, Pb, Sb, and B, $0<x \leq 1.2$, $0<y \leq 0.9$, $2.0<5 \leq z \leq 2.3$). These may be used singly or a plurality thereof may be mixed and used. The positive electrode active material preferably includes a $Li_xNi_2$, $Li_xCo_yNi_{1-y}O_2$, or $Li_xNi_{1-y}M_yO_z$ (M: at least one of Na, Mg, Sc. Y, Mn, Fe, Co, Ni, Cu, Zn, Al, Cr, Pb, Sb, and B, $0<x \leq 1.2$, $0<y \leq 0.9$, $2.0 \leq z \leq 2.3$) from the viewpoint that the capacity of the non-aqueous electrolyte secondary battery can be increased.

Examples of the conductive agent include carbon materials such as carbon black, acetylene black, Ketjenblack, and graphite. These may be used singly or may be used in combinations of two or more thereof.

Examples of the binder include fluoro resins such as polytetrafluoroethylene (PTFE) and poly(vinylidene fluoride) (PVdF), polyacrylonitrile (PAN), polyimides, acrylic resins, and polyolefins. These may be used singly or may be used in combinations of two or more thereof.

[Negative Electrode]

The negative electrode 12 comprises, for example, a negative electrode current collector made of metal foil or the like, and a negative electrode active material layer formed on the current collector. The negative electrode current collector here used can be, for example, foil of a metal, such as copper, which is stable in the electric potential range of the negative electrode, or a film in which such a metal is disposed on an outer layer. The negative electrode active material layer includes a negative electrode active material. The negative electrode active material layer suitably includes a binder, in addition to the negative electrode active material.

The negative electrode active material is not particularly limited as long as such a material can reversibly intercalate and deintercalate lithium ions, and examples include a carbon material such as natural graphite or artificial graphite, a metal to be alloyed with lithium, such as silicon (Si) or tin (Sn), or an alloy or complex oxide including a metal element such as Si or Sn. These may be used singly or may be used in combinations of two or more thereof.

The binder here used can be any binder used in the positive electrode 11. Examples of others include CMC or salts thereof, styrene-butadiene mbber (SBR), poly(acrylic acid)(PAA) or salts thereof, and poly(vinyl alcohol)(PVA).

[Heat-Resistant Layer]

The heat-resistant layer includes heat-resistant particles. The heat-resistant layer suitably includes a binder. The binder here used can be any binder for use in the positive electrode 11 and the negative electrode 12.

The heat-resistant particles are heat-resistant particles which have at least a surface including a metal compound and in which metal ions of the metal compound have an electronegativity of 13.5 or more, preferably 17.1 or more. In a case where the metal compound is a complex metal compound including a plurality of metals, ions of at least one of such metals may have an electronegativity of 13.5 or more, and ions of all such metals preferably have an electronegativity of 13.5 or more in view of an enhancement in ion permeability of the heat-resistant layer. The electronegativity (Xi) of such metal ions is determined according to the following expression.

$$\chi i = (1+2Z)\chi p$$

Z: valence
$\chi p$: Pauling's electronegativity

Examples of such a metal compound in which metal ions have an electronegativity of 13.5 or more include oxide, hydroxide, and oxyhydroxide each including at least any one of Ti, Sn, W, Nb, Mo, Si, B, Ge, and Bi. Among these, for example, any oxide, hydroxide, and oxyhydroxide are preferable which each include at least any one of Ti. Sn W, Nb, Mo, and Si, in view of low reactivity with a non-aqueous electrolyte and electrochemical stability.

The heat-resistant particles are obtained by, for example, covering surfaces of core particles with the metal compound. Such core particles are not particularly limited, and examples thereof include inorganic particles and resin particles. The method for covering with the metal compound is not particularly limited, and examples thereof include a mechanochemical method, an ion plating method, a sputtering method, and a plasma deposition method.

The heat-resistant particles may correspond to, for example, the metal compound by itself. The heat-resistant particles may correspond to, for example, any oxide, hydroxide, or oxyhydroxide including at least any one of Ti, Sn, W, Nb, Mo, Si, B, and GeBi, preferably including at least any one of Ti, Sn, W, Nb, Mo, and Si.

The average particle size of the heat-resistant particles is preferably, for example, in the range of 0.05 to 1 μm from the viewpoint that adjustment of the porosity of the heat-resistant layer within a desired range is facilitated. The average particle size here means any average particle size which is a volume average particle size measured by a laser diffraction method and which is a median size at a volume accumulated value of 50% in a particle size distribution. The average particle size can be measured using, for example, a laser diffraction particle size distribution measuring apparatus (Microtrac HRA manufactured by Nikkiso Co., Ltd.).

The heat-resistant particles may each have a spherical shape or a non-spherical shape. Examples of such a non-spherical shape include a polyhedron shape, a needle shape, and a necking shape. Such a necking shape means a structure in which a plurality of particles are connected (partial surface-contact structure). For example, heat-resistant particles each having a polyhedron shape, a needle shape, or a necking shape are preferable from the viewpoint that adjustment of the porosity of the heat-resistant layer within a desired range is facilitated.

The content of the heat-resistant particles is preferably 90 mass % or more, more preferably 95 mass % or more based on the total mass of the heat-resistant layer. The heat-resistant layer may include, for example, inorganic particles other than the heat-resistant particles. For example, the heat-resistant layer may include a metal compound in which metal ions have an electronegativity of less than 13.5. The content of such inorganic particles other than the heat-resistant particles is preferably 5 mass % or less based on the total mass of the heat-resistant layer.

The average thickness of the heat-resistant layer may be in the range of 0.5 μm to 5 μm, and is preferably, for example, in the range of 1 μm to 3 μm in view of more suppression of an increase in internal resistance of the battery and the temperature rise of the battery upon internal short. The average thickness of the heat-resistant layer is the average value of the thicknesses at any thirty points in observation of a cross section of the heat-resistant layer with a scanning electron microscope. The cross section of the heat-resistant layer is obtained by, for example, cutting out a portion of an electrode on which the heat-resistant layer is formed and processing the resultant by an ion milling apparatus (for example, IM4000PLUS manufactured by Hitachi High-Tech Corporation).

The porosity of the heat-resistant layer may be in the range of 25% to 55%, and is preferably, for example, in the range of 30% to 45% in view of more suppression of an increase in internal resistance of the battery and the temperature rise of the battery upon internal short. The porosity of the heat-resistant layer is determined as follows. First, a calibration curve derived from the fluorescent X-ray intensity of a coating film of heat-resistant particles having a known weight per area is used to determine the weight per area of the heat-resistant particles formed on the active material layer from the fluorescent X-ray intensity. The real volume (Vt) of the heat-resistant particles is determined from the real density and weight per area of the heat-resistant particles. The apparent volume (Va) of the heat-resistant layer is determined from the area and average thickness of a heat-resistant layer formed on an electrode. These are turned into the following expression, and thus the porosity (P) of the heat-resistant layer is determined.

$$P = 100 - 100 V_t / V_a$$

The average surface roughness (Ra) of the heat-resistant layer may be 0.35 μm or less, and is preferably, for example, 0.20 μm or less in view of more suppression of the temperature rise of the battery upon internal short. The average surface roughness (Ra) of the heat-resistant layer can be determined in conditions according to JIS B0601-1994 by use of analysis software (VK-Analyzer manufactured by Keyence Software Corporation) in observation of a surface of the heat-resistant layer with a laser microscope (VK9700 manufactured by Keyence Corporation).

Figure 2:
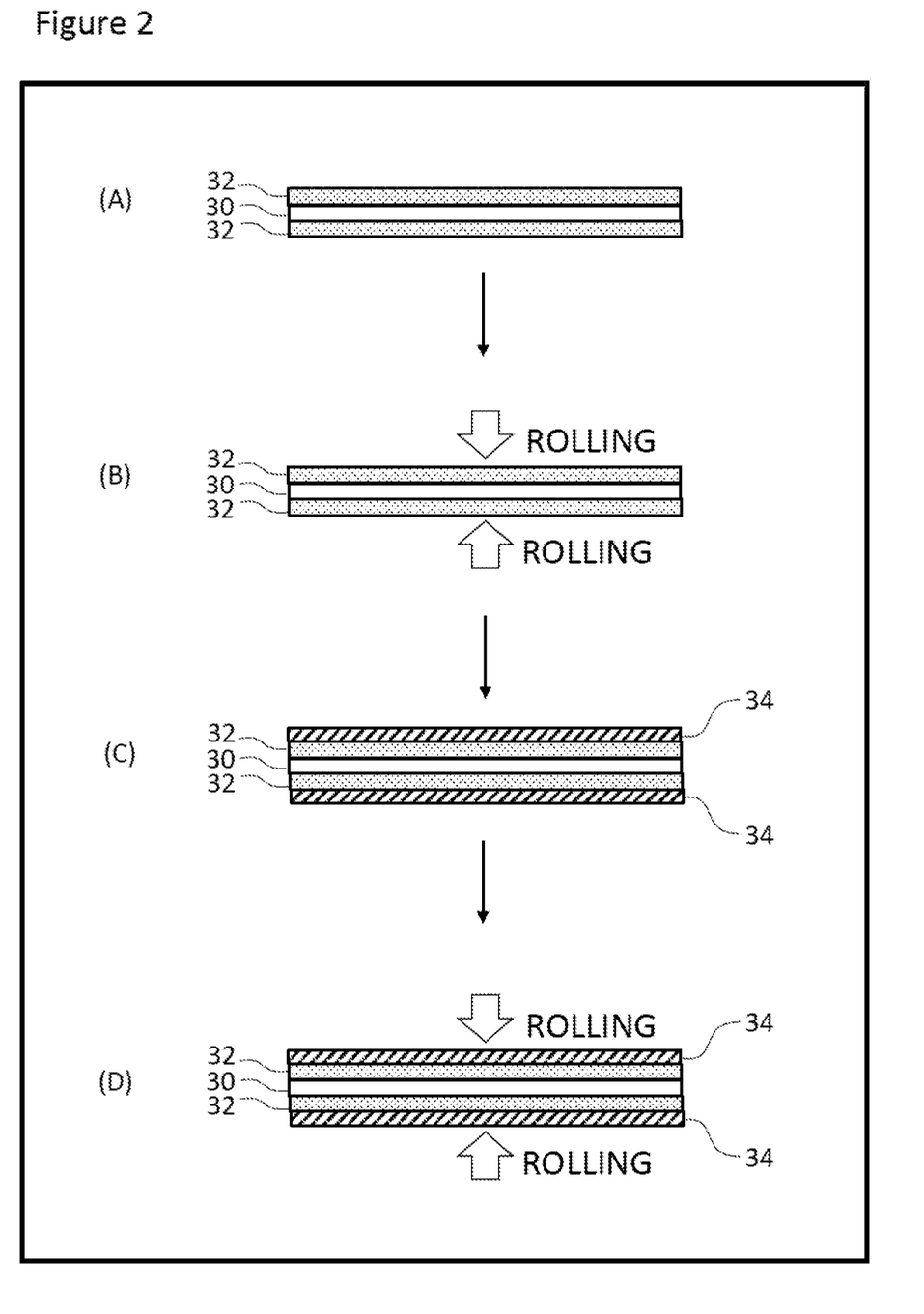
FIG. 2 is a flow diagram showing an exemplary method for forming an electrode structure comprising an electrode (negative electrode or positive electrode) and a heat-resistant layer formed on the electrode.

FIG. 2 is a flow diagram showing an exemplary method for forming an electrode structure comprising an electrode (negative electrode or positive electrode) and a heat-resistant layer formed on the electrode. (A) A current collector 30 is coated with a mixture slurry, and the resultant is dried, to thereby form an active material layer 32. In a case where a positive electrode active material layer is formed, a positive electrode current collector is coated with a positive electrode mixture slurry including a positive electrode active material, a binder, and the like, and the resultant is dried, and in a case where a negative electrode active material layer is formed, a negative electrode current collector is coated with a negative electrode mixture slurry including a negative electrode active material, a binder, and the like, and the resultant is dried. (B) The active material layer 32 formed is rolled by a roller or the like. Step (B) may also be here omitted. (C) The active material layer 32 is coated with a slurry for a heat-resistant layer including heat-resistant particles, a binder, and like, and the resultant is dried, to thereby form a heat-resistant layer 34. Alternatively, the active material layer may be simultaneously coated with a mixture slurry and such a slurry for a heat-resistant layer by use of a two-head die. In such a case, a step of drying the mixture slurry can also be omitted. (D) The heat-resistant layer 34 formed is rolled by a roller or the like. In step (D), the average thickness, porosity, and average surface roughness (Ra) of the heat-resistant layer 34 are adjusted within the respective predetermined ranges by rolling with the linear pressure applied to the heat-resistant layer 34 being regulated.

A plurality of exposed portions in which an electrode (substantially active material layer 32) located under the heat-resistant layer is exposed may be sometimes formed on a surface of the heat-resistant layer 34 by rolling the heat-resistant layer 34. The lengths of the exposed portions can be determined by, for example, observing a cross section of the electrode on which the heat-resistant layer 34 is formed, with a scanning electron microscope. In such a case, the maximum length for each of the exposed portions is preferably 30 μm or less and the sum of the lengths of the exposed portions is preferably 20% or less based on the length of the entire cross section of the electrode on which the heat-resistant layer 34 is formed. A case where the maximum length of each of the exposed portions and the proportion of the exposed portions do not satisfy the ranges may cause the temperature rise of the battery upon internal short as compared with a case where the ranges are satisfied. The exposed portions are easily formed in a case where step (B) described above is omitted, and thus step (B) is desirably performed in view of suppression of formation of the exposed portions.

The heat-resistant layer 34 may be formed on a portion of the active material layer 32, and is preferably formed on the entire surface of the active material layer 32, particularly preferably formed on the entire surface of the negative electrode active material layer. Internal short, although occurs between not only the positive electrode lead, but also the periphery thereof (non-coating portion with the positive electrode active material layer), and the negative electrode opposite thereto, naturally occurs additionally between the positive and negative electrodes. Accordingly, the heat-resistant layer 34 can be formed on the entire surface of the negative electrode active material layer, to thereby effectively suppress the temperature rise of the battery upon internal short.

[Separator]

For example, an ion-permeable and insulating porous sheet or the like is used as the separator 13. Specific examples of the porous sheet include a microporous thin film, woven fabric, and nonwoven fabric. Suitable examples of the material for the separator include olefin resins such as polyethylene and polypropylene, and cellulose. The separator 13 may be a laminate including a cellulose fiber layer and a layer of fibers of a thermoplastic resin such as an olefin resin. The separator may be a multi-layered separator including a polyethylene layer, a polypropylene layer and a mixture layer of polyethylene and polypropylene, may be a separator having a surface coated with a material such as an adhesive resin, an aramid resin or ceramic, or may include an inorganic filler in a porous sheet.

[Non-Aqueous Electrolyte]

The non-aqueous electrolyte includes a non-aqueous solvent and an electrolyte salt dissolved in the non-aqueous solvent. The non-aqueous electrolyte is not limited to a liquid electrolyte (non-aqueous electrolyte solution), and may be a solid electrolyte using a gel polymer or the like. Examples of the non-aqueous solvent that can be used include esters, ethers, nitriles such as acetonitrile, amides such as dimethylformamide, and any mixed solvent of two or more thereof. The non-aqueous solvent may contain a halogen-substituted product formed by replacing at least one hydrogen atom of any of the above solvents with a halogen atom such as fluorine.

Examples of the esters include cyclic carbonate esters such as ethylene carbonate (EC), propylene carbonate (PC), and butylene carbonate, chain carbonate esters such as dimethyl carbonate (DMC), ethyl methyl carbonate (EMC), dimethyl carbonate (DMC), methyl propyl carbonate, ethyl propyl carbonate, and methyl isopropyl carbonate, cyclic carboxylate esters such as γ-butyrolactone (GBL) and γ-valerolactone (GVL), and chain carboxylate esters such as methyl acetate, ethyl acetate, propyl acetate, methyl propionate (MP), ethyl propionate, and γ-butyrolactone.

Examples of the ethers include cyclic ethers such as 1,3-dioxolane, 4-methyl-1,3-dioxolane, tetrahydrofiuan, 2-methyltetrahydrofuran, propylene oxide, 1,2-butylene oxide, 1,3-dioxane, 1,4-dioxane, 1,3,5-trioxane, furan, 2-methylfuran, 1,8-cineole, and crown ethers, and chain ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether.

Preferable examples of the halogen-substituted product for use include a fluorinated cyclic carbonate ester such as fluoroethylene carbonate (FEC), a fluorinated chain carbonate ester, and a fluorinated chain carboxylate ester such as methyl fluoropropionate (FMP).

The electrolyte salt is preferably a lithium salt. Examples of the lithium salt include $LiBF_4$, $LiClO_4$, $LiPF_6$, $LiAsF_6$, $LiSbF_6$, $LiAlCl_4$, $LiSCN$. $LCF_3SO_3$, $LiCF_3CO_2$, $Li(P(C_2O_4)F_4)$, $LiPF_{6-x}(C_nF_{2n+1})_x$ (where 1<x<6, and n is 1 or 2), $LiB_{10}Cl_{10}$, LiC, LiBr, LiI, chloroborane lithium, lithium lower aliphatic carboxylate, borate salts such as $Li_2B_4O_7$ and $Li(B(C_2O_4)F_2)$, and imide salts such as $LiN(SO_2CF_3)_2$ and $LiN(CiF_{2l+1}SO_2)C_mF_{2m+1}SO_2)$ (where l and m are integers of 0 or more). These lithium salts may be used singly or a plurality thereof may be mixed and used. Among these, $LiPF_6$ is preferably used in view of ionic conductivity, electrochemical stability, and other properties. The concentration of the lithium salt is preferably 0.8 to 1.8 mol per liter of the non-aqueous solvent.

EXAMPLES

Hereinafter, the present disclosure will be further described with reference to Examples, but the present disclosure is not intended to be limited to such Examples.

Example 1

[Production of Positive Electrode]

Mixed were 100 parts by mass of lithium complex oxide particles ($LiNi_{0.88}Co_{0.09}Al_{0.03}O_2$) as a positive electrode active material, 1 part by mass of acetylene black as a conductive agent, and 1 part by mass of poly(vinylidene fluoride) as a binder, and an appropriately amount of NMP was further added thereto to prepare a positive electrode mixture slurry. Then, both sides of a positive electrode current collector made of aluminum foil were coated with the positive electrode mixture slurry (0.028 $g/cm^2$ per side), and the resulting coatings were dried. The coatings were cut out to predetermined electrode sizes, and rolled at a linear pressure of 3300 kgf/cm with roll pressing, to thereby produce a positive electrode in which a positive electrode active material layer was formed on each of both sides of the positive electrode current collector.

[Production of Heat-Resistant Layer]

Spherical titanium oxide particles (electronegativity (Xi) of titanium ions: 13.5) having an average particle size of 0.6 μm were used as heat-resistant particles. Stirred were then 100 parts by mass of the titanium oxide particles, 3 parts by mass of poly(vinylidene fluoride) as a binder, and an appropriately amount of NMP by a disperser (Filmix manufactured by PRIMIX Corporation), to thereby prepare a slurry for a heat-resistant layer. Then, the positive electrode active material layer was coated with the slurry for a heat-resistant layer, and the resultant coating was dried and thereafter rolled by roll pressing at a linear pressure of 200 kgf/cm, to thereby form a heat-resistant layer. The heat-resistant layer had an average thickness of 3 μm, a porosity of 33%, and an average surface roughness (Ra) of 0.12 μm. The measurement method was as described above. The cross section of the heat-resistant layer produced was observed with SEM, but no exposed portions were observed.

[Production of Negative Electrode]

Mixed were 98.7 parts by mass of a graphite powder as a negative electrode active material, 0.7 parts by mass of CMC (sodium carboxymethyl cellulose), and 0.6 parts by mass of SBR (styrene-butadiene rubber), and furthermore an appropriately amount of water was added to thereby prepare a negative electrode mixture slurry. Next, both sides of a negative electrode current collector made of copper foil were coated with the negative electrode mixture slurry (0.013 $g/cm^2$ per side), and the resulting coatings were dried. The coatings were cut out to predetermined electrode sizes, and rolled at a linear pressure of 200 kgf/cm with roll pressing, to thereby produce a negative electrode in which a negative electrode active material layer was formed on each of both sides of the negative electrode current collector.

[Preparation of Non-Aqueous Electrolyte]

A mixed solvent was obtained by mixing ethylene carbonate (EC), ethyl methyl carbonate (EMC), and dimethyl carbonate (DMC) in a volume ratio of 3:3:4, and lithium hexafluorophosphate (LiPF$_6$) was dissolved therein at a concentration of 1.2 mol/L. The resultant was used as a non-aqueous electrolyte.

[Production of Non-Aqueous Electrolyte Secondary Battery]

An aluminum lead and a nickel lead were attached to the positive electrode and the negative electrode, respectively, and the positive electrode and the negative electrode were wound with a polyethylene separator having a thickness of 14 μm being interposed therebetween, to thereby produce a wound-type electrode element. The electrode element was housed in a cylindrical battery case body, a non-aqueous electrolyte was injected thereto, and thereafter the battery case body was sealed by a gasket and a sealing assembly. The resultant was adopted as a non-aqueous electrolyte secondary battery.

Example 2

A non-aqueous electrolyte secondary battery was produced in the same manner as in Example 1 except that no rolling by roll pressing was performed in production of the positive electrode, the linear pressure in rolling by roll pressing in production of the heat-resistant layer was 3300 kgf/cm, and the weight per area was adjusted so that the average thickness of the heat-resistant layer was 5 μm. The heat-resistant layer in Example 2 had a porosity of 33%, and an average surface roughness (Ra) of 0.12 μm. The cross section of the heat-resistant layer produced was observed with SEM, and thus exposed portions were observed. The maximum length for each of the exposed portions (hereinafter, the maximum length of each of the exposed portions) was 1 μm, and the proportion of the sum of the lengths of the exposed portions relative to the length of the entire surface of the electrode (hereinafter, the proportion of the exposed portions) was 1%.

Example 3

A non-aqueous electrolyte secondary battery was produced in the same manner as in Example 1 except that no rolling by roll pressing was performed in production of the positive electrode, the linear pressure in rolling by roll pressing in production of the heat-resistant layer was 3300 kgf/cm, and the weight per area was adjusted so that the average thickness of the heat-resistant layer was 0.5 μm. The heat-resistant layer in Example 3 had a porosity of 33%, and an average surface roughness (Ra) of 0.12 μm. The cross section of the heat-resistant layer produced was observed with SEM, and thus exposed portions were observed. The maximum length of each of the exposed portions was 30 μm and the proportion of the exposed portions was 20%.

Example 4

A non-aqueous electrolyte secondary battery was produced in the same manner as in Example 1 except that no rolling by roll pressing was performed in production of the positive electrode, spherical titanium oxide particles having an average particle size of 1 μm were used in production of the heat-resistant layer, the linear pressure in rolling by roll pressing was 3300 kgf/cm, and the weight per area was adjusted so that the average thickness of the heat-resistant layer was 3 μm. The heat-resistant layer in Example 4 had a porosity of 25%, and an average surface roughness (Ra) of 0.25 μm. The cross section of the heat-resistant layer produced was observed with SEM, and thus exposed portions were observed. The maximum length of each of the exposed portions was 9 μm and the proportion of the exposed portions was 6%.

Example 5

A non-aqueous electrolyte secondary battery was produced in the same manner as in Example 1 except that no rolling by roll pressing was performed in production of the positive electrode, spherical titanium oxide particles having an average particle size of 0.05 μm were used in production of the heat-resistant layer, the linear pressure in rolling by roll pressing was 3300 kgf/cm, and the weight per area was adjusted so that the average thickness of the heat-resistant layer was 2 μm. The heat-resistant layer in Example 5 had a porosity of 45%, and an average surface roughness (Ra) of 0.09 μm. The cross section of the heat-resistant layer produced was observed with SEM, and thus exposed portions were observed. The maximum length of each of the exposed portions was 7 μm and the proportion of the exposed portions was 8%.

Example 6

A non-aqueous electrolyte secondary battery was produced in the same manner as in Example 1 except that no rolling by roll pressing was performed in production of the positive electrode, spherical SnO$_2$ particles ($\chi i$ of tin ions: 18) having an average particle size of 0.9 μm were used in production of the heat-resistant layer, the linear pressure in rolling by roll pressing was 3300 kgf/cm, and the weight per area was adjusted so that the average thickness of the heat-resistant layer was 2 μm. The heat-resistant layer in Example 6 had a porosity of 30%, and an average surface roughness (Ra) of 0.11 μm. The cross section of the heat-resistant layer produced was observed with SEM, and thus exposed portions were observed. The maximum length of each of the exposed portions was 12 μm and the proportion of the exposed portions was 9%.

Example 7

A non-aqueous electrolyte secondary battery was produced in the same manner as in Example 1 except that no rolling by roll pressing was performed in production of the positive electrode, granular WO$_3$ particles ($\chi i$ of tungsten ions: 31.2) having an average particle size of 0.3 μm were used in production of the heat-resistant layer, the linear pressure in rolling by roll pressing was 3300 kgf/cm, and the weight per area was adjusted so that the average thickness of the heat-resistant layer was 2 μm. The heat-resistant layer in Example 7 had a porosity of 33%, and an average surface roughness (Ra) of 0.12 μm. The cross section of the heat-resistant layer produced was observed with SEM, and thus exposed portions were observed. The maximum length of each of the exposed portions was 9 μm and the proportion of the exposed portions was 8%.

Example 8

A non-aqueous electrolyte secondary battery was produced in the same manner as in Example 1 except that no rolling by roll pressing was performed in production of the positive electrode, granular Nb$_2$O$_5$ particles ($\chi i$ of niobium ions: 17.6) having an average particle size of 1 μm were used in production of the heat-resistant layer, the linear pressure in rolling by roll pressing was 3300 kgf/cm, and the weight per area was adjusted so that the average thickness of the heat-resistant layer was 2 μm. The heat-resistant layer in Example 8 had a porosity of 34%, and an average surface roughness (Ra) of 0.17 μm. The cross section of the heat-resistant layer produced was observed with SEM, and thus exposed portions were observed. The maximum length of each of the exposed portions was 10 μm and the proportion of the exposed portions was 11%.

Example 9

A non-aqueous electrolyte secondary battery was produced in the same manner as in Example 1 except that no rolling by roll pressing was performed in production of the positive electrode, granular $MoO_3$ particles ($\chi i$ of molybdenum ions: 28.6) having an average particle size of 0.6 μm were used in production of the heat-resistant layer, the linear pressure in rolling by roll pressing was 3300 kgf/cm, and the weight per area was adjusted so that the average thickness of the heat-resistant layer was 2 μm. The heat-resistant layer in Example 9 had a porosity of 31%, and an average surface roughness (Ra) of 0.13 μm. The cross section of the heat-resistant layer produced was observed with SEM, and thus exposed portions were observed. The maximum length of each of the exposed portions was 7 μm and the proportion of the exposed portions was 9%.

Example 10

A non-aqueous electrolyte secondary battery was produced in the same manner as in Example 1 except that no rolling by roll pressing was performed in production of the positive electrode, spherical $SiO_2$ particles (i of silicon ions: 17.1) having an average particle size of 0.6 μm were used in production of the heat-resistant layer, the linear pressure in rolling by roll pressing was 3300 kgf/cm, and the weight per area was adjusted so that the average thickness of the heat-resistant layer was 2 μm. The heat-resistant layer in Example 10 had a porosity of 35%, and an average surface roughness (Ra) of 0.11 μm. The cross section of the heat-resistant layer produced was observed with SEM, and thus exposed portions were observed. The maximum length of each of the exposed portions was 5 μm and the proportion of the exposed portions was 3%.

Example 11

A non-aqueous electrolyte secondary battery was produced in the same manner as in Example 1 except that no rolling by roll pressing was performed in production of the positive electrode, polyhedron-shaped $TiO_2$ particles having an average particle size of 0.8 μm were used in production of the heat-resistant layer, the linear pressure in rolling by roll pressing was 3300 kgf/cm, and the weight per area was adjusted so that the average thickness of the heat-resistant layer was 2 μm. The heat-resistant layer in Example 11 had a porosity of 46%, and an average surface roughness (Ra) of 0.08 μm. The cross section of the heat-resistant layer produced was observed with SEM, and thus exposed portions were observed. The maximum length of each of the exposed portions was 5 μm and the proportion of the exposed portions was 7%.

Example 12

A non-aqueous electrolyte secondary battery was produced in the same manner as in Example 1 except that no rolling by roll pressing was performed in production of the positive electrode, needle-shaped $TiO_2$ particles having an average particle size of 0.09 μm were used in production of the heat-resistant layer, the linear pressure in rolling by roll pressing was 3300 kgf/cm, and the weight per area was adjusted so that the average thickness of the heat-resistant layer was 2 μm. The heat-resistant layer in Example 12 had a porosity of 55%, and an average surface roughness (Ra) of 0.05 μm. The cross section of the heat-resistant layer produced was observed with SEM, and thus exposed portions were observed. The maximum length of each of the exposed portions was 3 μm and the proportion of the exposed portions was 5%.

Example 13

A non-aqueous electrolyte secondary battery was produced in the same manner as in Example 1 except that no rolling by roll pressing was performed in production of the positive electrode, necking-shaped $TiO_2$ particles having an average particle size of 0.8 μm were used in production of the heat-resistant layer, the linear pressure in rolling by roll pressing was 3300 kgf/cm, and the weight per area was adjusted so that the average thickness of the heat-resistant layer was 2 μm. The heat-resistant layer in Example 13 had a porosity of 51%, and an average surface roughness (Ra) of 0.35 μm. The cross section of the heat-resistant layer produced was observed with SEM, and thus exposed portions were observed. The maximum length of each of the exposed portions was 6 μm and the proportion of the exposed portions was 5%.

Example 14

A non-aqueous electrolyte secondary battery was produced in the same manner as in Example 1 except that no rolling by roll pressing was performed in production of the negative electrode and the heat-resistant layer was not formed on the positive electrode, but the heat-resistant layer was formed on the negative electrode. The heat-resistant layer in Example 14 had an average thickness of 2 μm, a porosity of 33%, and an average surface roughness (Ra) of 0.2 μm. The cross section of the heat-resistant layer produced was observed with SEM, and thus exposed portions were observed. The maximum length of each of the exposed portions was 16 μm and the proportion of the exposed portions was 10%.

Comparative Example 1

A non-aqueous electrolyte secondary battery was produced in the same manner as in Example 1 except that spherical MgO particles ($\chi i$ of magnesium ions: 6.5) having an average particle size of 0.6 μm were used in production of the heat-resistant layer. The heat-resistant layer in Comparative Example 1 had an average thickness of 3 μm, a porosity of 40%, and an average surface roughness (Ra) of 0.15 μm. The cross section of the heat-resistant layer produced was observed with SEM, and thus no exposed portions were observed.

Comparative Example 2

A non-aqueous electrolyte secondary battery was produced in the same manner as in Example 1 except that no rolling by roll pressing was performed in production of the heat-resistant layer. The heat-resistant layer in Comparative Example 2 had an average thickness of 3 µm, a porosity of 60%, and an average surface roughness (Ra) of 1.22 µm. The cross section of the heat-resistant layer produced was observed with SEM, and thus no exposed portions were observed.

[Internal Short Test]

Each of the non-aqueous electrolyte secondary batteries of Examples and Comparative Examples was charged to a battery voltage of 4.20 V at a constant current value of 500 mA and then charged at a constant voltage of 4.2 V for 60 minutes. Thereafter, foreign substances were loaded onto the positive electrode, and the temperature of the lateral portion of the battery, at which forced short was made according to JLS C 8714, was measured by a thermocouple. The maximum temperature of the temperatures of the battery measured was defined as the temperature of the battery upon internal short.

[Measurement of Internal Resistance]

Each of the non-aqueous electrolyte secondary batteries of Examples and Comparative Examples was charged to a battery voltage of 3.7 V at a constant current value of 500 mA and then charged at a low voltage of 3.7 V for 60 minutes. Thereafter, such each battery was discharged at 1500 mA for 10 seconds. The internal resistance of the battery R (mΩ) was determined according to the following expression under the assumption that the open-circuit voltage before discharge was V1 and the open-circuit voltage after discharge for 10 seconds was V2.

$$R=(V1-V2)/1.5$$

The results about the temperature of each of the batteries of Examples and Comparative Examples upon internal short and the internal resistance of each of these batteries are summarized in Table 1.

lower internal resistance of the battery than that exhibited in Comparative Example 1. In other words, it can be said that a non-aqueous electrolyte secondary battery comprising a positive electrode, a negative electrode, a heat-resistant layer formed on at least any one of the positive electrode and the negative electrode, and a non-aqueous electrolyte, in which the heat-resistant layer includes heat-resistant particles having at least a surface including a metal compound, the heat-resistant layer has an average thickness in the range of 0.5 µm to 5 µm, the heat-resistant layer has a porosity of 25% to 55%, the heat-resistant layer has an average surface roughness (Ra) of 0.35 µm or less, and metal ions in the metal compound have an electronegativity of 13.5 or more can be not only suppressed in an increase in internal resistance of the battery, but also suppressed in the temperature rise of the battery upon internal short.

REFERENCE SIGNS LIST 10 non-aqueous electrolyte secondary battery
11 positive electrode
12 negative electrode
13 separator
14 electrode element
15 battery case
16 case body
17 sealing assembly
18, 19 insulating plate
20 positive electrode lead
21 negative electrode lead
22 projecting portion
23 filter
24 lower vent member
25 insulating member
26 upper vent member
27 cap

TABLE 1

| | | Heat-resistant layer | | | | | | Battery performance | |
|---|---|---|---|---|---|---|---|---|---|
| | Location | Heat-resistant particles ($\chi i$) | Average thickness (µm) | Porosity (%) | Average surface roughness (µm) | Maximum length of each of exposed portions (µm) | Proportion of exposed portions | Temperature of battery upon internal short (° C.) | Internal resistance of battery (mΩ) |
| Example 1 | On positive electrode | TiO$_2$ (13.5) | 3 | 33 | 0.12 | 0 | 0 | 25 | 44.3 |
| Example 2 | | | 5 | 33 | 0.12 | 1 | 1 | 25 | 44.5 |
| Example 3 | | | 0.5 | 33 | 0.12 | 30 | 20 | 31 | 43.0 |
| Example 4 | | | 3 | 25 | 0.25 | 9 | 6 | 25 | 43.8 |
| Example 5 | | | 2 | 45 | 0.09 | 7 | 8 | 25 | 43.9 |
| Example 6 | | SnO$_2$ (18) | 2 | 30 | 0.11 | 12 | 9 | 25 | 43.6 |
| Example 7 | | WO$_3$ (31.2) | 2 | 33 | 0.12 | 9 | 8 | 25 | 43.1 |
| Example 8 | | Nb$_2$O$_5$ (17.6) | 2 | 34 | 0.17 | 10 | 11 | 25 | 43.7 |
| Example 9 | | MoO$_3$ (28.6) | 2 | 31 | 0.13 | 7 | 9 | 25 | 43.2 |
| Example 10 | | SiO$_2$ (17.1) | 2 | 35 | 0.11 | 5 | 3 | 25 | 43.4 |
| Example 11 | | TiO$_2$ (13.5) | 2 | 46 | 0.08 | 5 | 7 | 25 | 43.5 |
| Example 12 | | | 2 | 55 | 0.05 | 3 | 5 | 25 | 43.4 |
| Example 13 | | | 2 | 51 | 0.35 | 6 | 5 | 25 | 43.4 |
| Example 14 | On negative electrode | | 2 | 33 | 0.2 | 16 | 10 | 25. | 43.8 |
| Comparative Example 1 | On positive electrode | MgO (6.5) | 3 | 40 | 0.15 | 0 | 0 | 25 | 45.8 |
| Comparative Example 2 | | TiO$_2$ (13.5) | 3 | 60 | 1.22 | 0 | 0 | 66 | 44.0 |

Examples 1 to 14 each exhibited a lower temperature of the battery upon internal short than that exhibited in Comparative Example 2. Examples 1 to 14 each exhibited a 28 gasket
30 current collector
32 active material layer
34 heat-resistant layer.

The invention claimed is:

1. A non-aqueous electrolyte secondary battery comprising:
   a positive electrode;
   a negative electrode;
   a heat-resistant layer formed on at least any one of the positive electrode and the negative electrode; and
   a non-aqueous electrolyte; wherein
   the heat-resistant layer includes heat-resistant particles having at least a surface including a metal compound,
   the heat-resistant layer has an average thickness in the range of 0.5 μm to 5 μm, the heat-resistant layer has a porosity of 25% to 55%, the heat-resistant layer has an average surface roughness (Ra) of 0.35 μm or less,
   metal ions in the metal compound have an electronegativity of 13.5 or more, and
   a plurality of exposed portions in which an electrode located under the heat-resistant layer is partially exposed are present on a surface of the heat-resistant layer, and a maximum length for each of the exposed portions is 3 μm or more and 30 μm or less.

2. The non-aqueous electrolyte secondary battery according to claim 1, wherein the heat-resistant particles have an average particle size of 0.05 μm to 1 μm.

3. The non-aqueous electrolyte secondary battery according to claim 1, wherein the metal compound corresponds to an oxide, a hydroxide, or an oxyhydroxide including at least any one of Ti, Sn, W, Nb, Mo, and Si.

4. The non-aqueous electrolyte secondary battery according to claim 1, wherein the heat-resistant particles each correspond to an oxide, a hydroxide, or an oxyhydroxide including at least any one of Ti, Sn, W, Nb, Mo, and Si.

5. The non-aqueous electrolyte secondary battery according to claim 1, wherein the heat-resistant particles each have a polyhedron shape, a needle shape, or a necking shape.

6. The non-aqueous electrolyte secondary battery according to claim 1, wherein a sum of lengths of the exposed portions is 20% or less based on a length of an entire surface of the electrode, in any cross section of the electrode.

7. The non-aqueous electrolyte secondary battery according to claim 1, wherein the negative electrode comprises a negative electrode current collector and a negative electrode active material layer formed on the negative electrode current collector, wherein
   the heat-resistant layer is formed on an entire surface of the negative electrode active material layer.

8. An electrode structure comprising:
   an electrode for use as a positive electrode or a negative electrode of a non-aqueous electrolyte secondary battery; and
   a heat-resistant layer formed on the electrode; wherein
   the heat-resistant layer includes heat-resistant particles having at least a surface including a metal compound,
   the heat-resistant layer has an average thickness in the range of 0.5 μm to 5 μm, the heat-resistant layer has a porosity of 25% to 55%, the heat-resistant layer has an average surface roughness (Ra) of 0.35 μm or less,
   metal ions in the metal compound have an electronegativity of 13.5 or more, and
   a plurality of exposed portions in which an electrode located under the heat-resistant layer is partially exposed are present on a surface of the heat-resistant layer, and a maximum length for each of the exposed portions is 3 μm or more and 30 μm or less.

9. The non-aqueous electrolyte secondary battery according to claim 1, wherein the metal compound corresponds to an oxide, a hydroxide, or an oxyhydroxide including at least any one of W, Nb and Mo.

10. The electrode structure according to claim 8, wherein the metal compound corresponds to an oxide, a hydroxide, or an oxyhydroxide including at least any one of W, Nb and Mo.

* * * * *